(12) United States Patent
Hagimoto et al.

(10) Patent No.: US 9,150,267 B2
(45) Date of Patent: Oct. 6, 2015

(54) FUEL-TANK SUPPORT STRUCTURE FOR MOTORCYCLE

(71) Applicant: HONDA MOTOR CO., LTD., Tokyo (JP)

(72) Inventors: Masashi Hagimoto, Wako (JP); Masanori Usa, Wako (JP); Hideaki Haraguchi, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 0 days.

(21) Appl. No.: 13/902,856

(22) Filed: May 27, 2013

(65) Prior Publication Data

US 2014/0035269 A1 Feb. 6, 2014

(30) Foreign Application Priority Data

Jul. 31, 2012 (JP) .................................. 2012-169955

(51) Int. Cl.
*B62J 35/00* (2006.01)
(52) U.S. Cl.
CPC ........................................ *B62J 35/00* (2013.01)
(58) Field of Classification Search
CPC .................................. B62K 11/04; B62J 35/00

USPC .......................................... 180/219; 280/835
See application file for complete search history.

(56) References Cited

U.S. PATENT DOCUMENTS 7,997,622 B2 * 8/2011 Yamada .......................... 280/835
2011/0204613 A1 * 8/2011 Aoki ............................. 280/830

FOREIGN PATENT DOCUMENTS

JP 3489918 B2 3/1997

* cited by examiner

*Primary Examiner* — Joseph Rocca
*Assistant Examiner* — Felicia L Brittman
(74) *Attorney, Agent, or Firm* — Mori & Ward, LLP

(57) ABSTRACT

A fuel-tank support structure for a motorcycle includes a left outer extending portion, a right outer extending portion, a left tank support stay, and a right tank support stay. The left outer extending portion is provided in a left main frame to extend outward in a vehicle width direction of the motorcycle. The left main frame extends rearward to diverge from a head pipe to left. The right outer extending portion is provided in a right main frame to extend outward in the vehicle width direction. The right main frame extends rearward to diverge from the head pipe to right. The left tank support stay protrudes from a fuel tank and is supported by the left outer extending portion. The right tank support stay protrudes from the fuel tank and is supported by the right outer extending portion.

16 Claims, 8 Drawing Sheets ional view taken along A-A line in FIG. 5.

FUEL-TANK SUPPORT STRUCTURE FOR MOTORCYCLE

CROSS-REFERENCE TO RELATED APPLICATIONS

The present application claims priority under 35 U.S.C. §119 to Japanese Patent Application No. 2012-169955, filed Jul. 31, 2012. The contents of this application are incorporated herein by reference in their entirety.

BACKGROUND OF THE INVENTION

1. Field of the Invention

The present invention relates to a fuel-tank support structure for a motorcycle.

2. Discussion of the Background

A motorcycle that has a shaft (hereinafter referred to as "outer extending portion") protrusively provided on a main frame extending rearward from a head pipe to extend outward in the vehicle width direction and a fuel tank supported by the outer extending portion is known in the related art (see, for example, JP Patent No. 3489918).

The motorcycle is structured such that, as shown in FIG. 3 and the like of JP Patent No. 3489918, the main frame is formed of a length of member extending longitudinally at the center in the vehicle width direction, and the fuel tank is formed in an inverted U shape covering the main frame from above and both sides as viewed in a vertical section, so that a recess is formed in the underside of the fuel tank and the outer extending portion supports the fuel tank from below within the recess of the fuel tank.

SUMMARY OF THE INVENTION

According to one aspect of the present invention, a fuel-tank support structure for a motorcycle includes a left outer extending portion, a right outer extending portion, a left tank support stay, and a right tank support stay. The left outer extending portion is provided in a left main frame to extend outward in a vehicle width direction of the motorcycle. The left main frame extends rearward to diverge from a head pipe to left. The right outer extending portion is provided in a right main frame to extend outward in the vehicle width direction. The right main frame extends rearward to diverge from the head pipe to right. The left tank support stay protrudes from a fuel tank and is supported by the left outer extending portion. The right tank support stay protrudes from the fuel tank and is supported by the right outer extending portion.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings.

DESCRIPTION OF THE EMBODIMENTS

Figure 1:
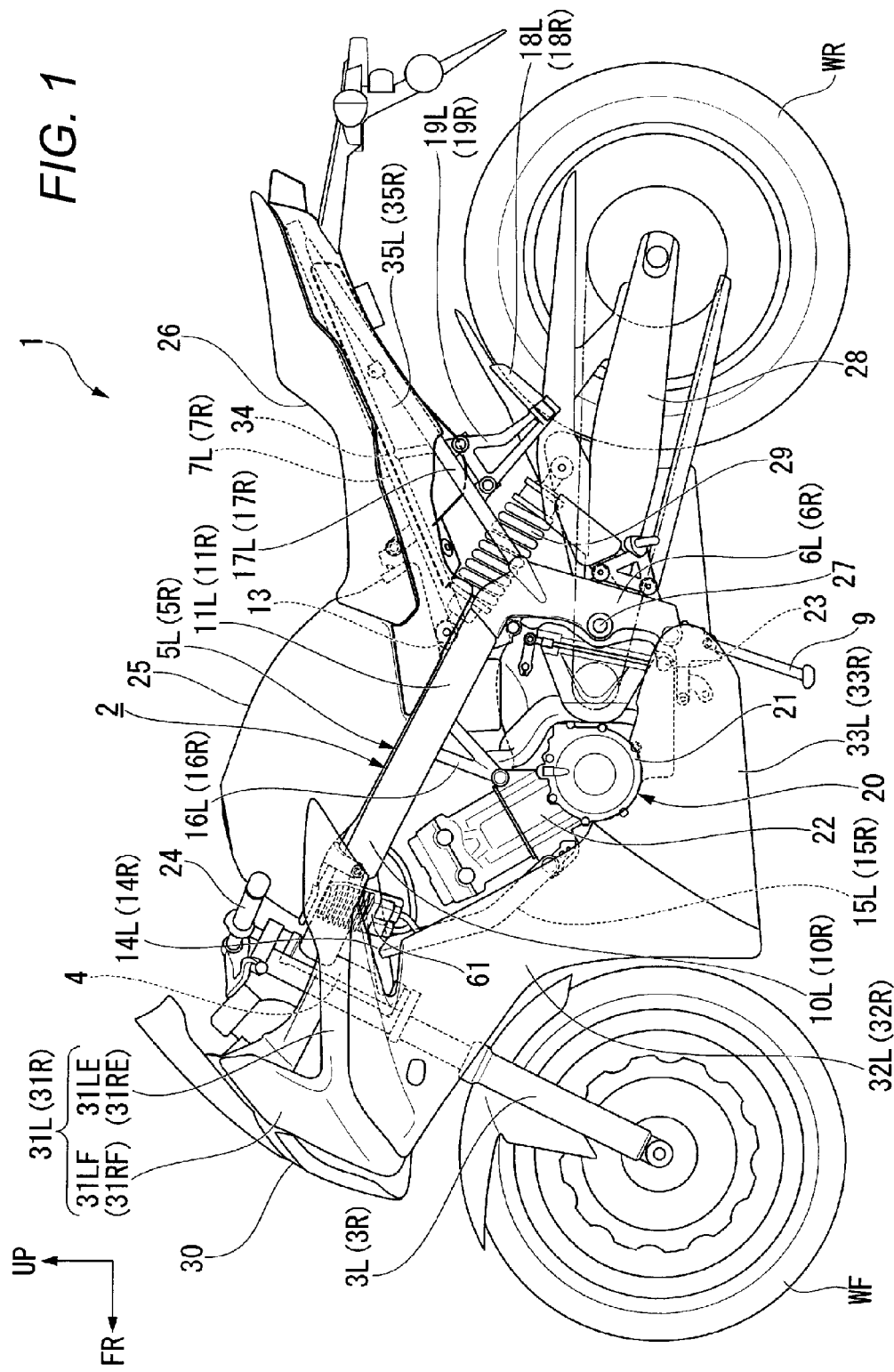
FIG. 1 is a left side view of a motorcycle adopting a structure according to an embodiment.

The embodiments will now be described with reference to the accompanying drawings, wherein like reference numerals designate corresponding or identical elements throughout the various drawings.

It is to be noted that, in the drawings referred to in the following description, arrow FR indicates the front of the vehicle, arrow UP indicates the upper side of the vehicle, and arrow LH indicates the left of the vehicle.

Figure 2:
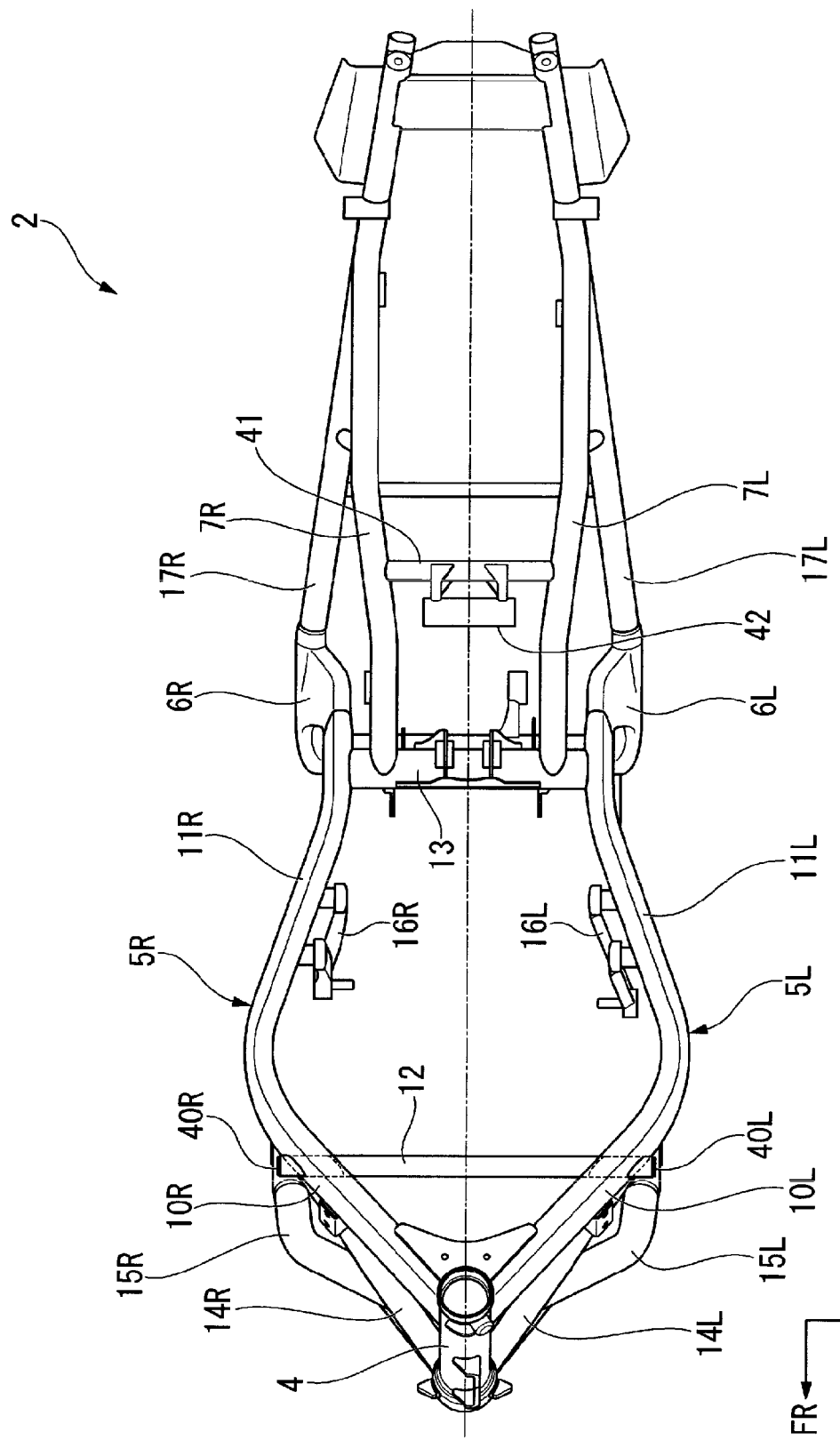
FIG. 2 is a top view of a body frame of the motorcycle.

FIG. 1 shows a motorcycle 1 according to a first embodiment of the present invention, while FIG. 2 shows a top view of a body frame 2 of the motorcycle 1. The body frame 2 of the motorcycle 1 includes a head pipe 4 rotatably supporting a pair of left and right front forks 3L, 3R, a pair of left and right main frames 5L, 5R diverging from the head pipe 4 to the right and left so as to extend in an obliquely rearward and downward direction, a pair of left and right pivot plates 6L, 6R extending downward from the rear ends of the main frames 5L, 5R, and seat frames 7L, 7R longitudinally extending at the rear of the main frames 5L, 5R. In FIG. 1, members not appearing in the drawings are indicated by parenthesized signs for the sake of convenience in description.

As shown in FIG. 2, the main frames 5L, 5R have front extending portions 10L, 10R diverging from the head pipe 4 to extend rearward and also outward in the vehicle width direction, and rear extending portions 11L, 11R adjoining the rear ends of the front extending portions 10L, 10R and extending rearward and also inward in the vehicle width direction. A front cross frame 12 for connection between the front extending portions 10L, 10R extends in the vehicle width direction to lay between rear portions of the front extending portions 10L, 10R. A rear cross frame 13 lays between rear portions of the rear extending portions 11L, 11R for connection between the rear extending portions 11L, 11R. The front ends of the seat frames 7L, 7R are connected to the rear cross frame 13. The seat frames 7L, 7R extend from the rear cross frame 13 in an obliquely rearward and upward direction.

A pair of left and right gusset pipes 14L, 14R extends from a lower portion of the head pipe 4 in an obliquely rearward and upward direction. The rear ends of the gusset pipes 14L, 14R are connected to the rear portion of the front extending portions 10L, 10R of the main frame 5L, 5R. The gusset pipes 14L, 14R are respectively connected to a pair of left and right down frames 15L, 15R extending in an obliquely rearward and downward direction. A pair of left and right cylinder hangers 16L, 16R extending downward are secured to approximately longitudinally central areas of the rear extending portions 11L, 11R of the main frames 5L, 5R.

A pair of left and right reinforcing pipes 17L, 17R are connected to the pivot plates 6L, 6R. The reinforcing pipes 17L, 17R extend below the seat frames 7L, 7R in an obliquely rearward and upward direction to be connected to the rear ends of the seat frames 7L, 7R. As shown in FIG. 2, the areas from the front ends to the approximate longitudinal centers of the reinforcing pipes 17L, 17R are located more outward in the vehicle width direction than the seat frames 7L, 7R are located as viewed from the top. The left and right reinforcing pipes 17L, 17R extend rearward in such a manner as to gradually decrease the distance from each other in the vehicle width direction. Specifically, in the embodiment, the distance between the left and right seat frames 7L, 7R is set to be smaller than the distance between the left and right reinforcing pipes 17L, 17R.

Further, as shown in FIG. 1, step stays 19L, 19R supporting at lower ends pillion steps 18L, 18R on which the pillion passenger is to place his/her feet are respectively secured to front portions of the reinforcing pipes 17L, 17R so as to extend downward.

A side stand 9 is provided on a lower portion of the left pivot plate 6L. The side stand 9 supports the motorcycle 1 in a position somewhat tilted to the left.

An engine 20 is supported below the main frames 5L, 5R. The embodiment adopts a multi-cylinder in-line engine as the engine 20. The engine 20 includes a crankcase 21, and a cylinder unit 22 extending from a front upper portion of the crankcase 21 in an obliquely forward and upward direction.

The engine 20 has a front portion of the cylinder unit 22 supported by lower portions of the down frames 15L, 15R, and a rear portion of the cylinder unit 22 supported by lower portions of the cylinder hangers 16L, 16R. In addition, the engine 20 has a rear portion of the crankcase 21 supported by a support shaft 23 laying between lower portions of the pivot plates 6L, 6R.

A front wheel WF is rotatably supported between lower portions of the left and right front forks 3L, 3R rotatably supported at the head pipe 4. A steering handlebar 24 is provided on upper portions of the front forks 3L, 3R. A fuel tank 25 is supported on upper portions of the main frames 5L, 5R at the rear of the head pipe 4. A seat 26 on which an occupant is to sit is placed at the rear of the fuel tank 25. The seat 26 extends along the seat frames 7L, 7R in the longitudinal direction and is supported by the seat frames 7L, 7R.

A pivot shaft 27 is placed to lay between approximately vertically central areas of the pivot plates 6L, 6R. A vertically swingable swing arm 28 is supported by the pivot shaft 27. A rear wheel WR is rotatably supported at the rear end of the swing arm 28. Then, a rear cushion 29 is mounted between the swing arm 28 and the rear cross frame 13.

The body cover includes a front cover 30 that is placed in front of the head pipe 4, has a fixed width in the vehicle width direction and extends in an obliquely rearward and upward direction. A pair of left and right tank shrouds 31L, 31R, which are contiguous with the left and right edges of the front cover 30 and extend rearward, are placed on the lateral sides of the head pipe 4. In addition, a pair of left and right front side covers 32L, 32R, which are contiguous with the tank shrouds 31L, 31R and extend downward, are placed beneath the tank shrouds 31L, 31R.

The tank shrouds 31L, 31R are formed respectively to have integrated combinations of front contiguous portions 31LF, 31RF that are long in the up-and-down direction and extend fully along the left and right edges of the front cover 30 in the up-and-down direction, and rear extending portions 31LE, 31RE that extend rearward from an approximately vertically central position of the front contiguous portions 31LF, 31RF to have rear ends formed in a shape tapering down toward the tip. The rear ends of the rear extending portions 31LE, 31RE reach respectively front side faces of the fuel tank 25 so as to cover the front side faces of the fuel tank 25.

The front side covers 32L, 32R have respectively upper edges contiguous and along with both lower edges of the front contiguous portions 31LF, 31RF and the rear extending portions 31LE, 31RE of the tank shrouds 31L, 31R, and extend downward. In the front side covers 32L, 32R, front edges, which extend downward from the front ends of the respective upper edges, are formed in an arc shape along the front wheel WF, and rear edges, which extend downward from the rear ends of the respective upper edges, extend downward along the down frames 15L, 15R.

In turn, a pair of left and right under cowls 33L, 33R are contiguous with lower portions of the front side covers 32L, 32R. The under cowls 33L, 33R extend rearward to reach lower portions of the pivot plates 6L, 6R so as to cover a lower portion of the crankcase 21.

In the vehicle rear section, the storage box 34 is placed below the seat 26. The storage box 34 extends longitudinally along the seat frames 7L, 7R. Then, the storage box 34 is covered with a pair of left and right seat side covers 35L, 35R from the outside in the vehicle width direction. The seat side covers 35L, 35R respectively extend below the seat 26 in an obliquely rearward and upward direction along the seat frames 7L, 7R and the reinforcing pipes 17L, 17R.

The front ends of the seat side covers 35L, 35R extend out from the front portions of the seat frames 7L, 7R in the upward direction so as to cover the rear side faces of the fuel tank 25. The rear ends of the seat side covers 35L, 35R extend to underneath the rear end of the seat 26.

In the motorcycle 1, an upward-facing opening of the storage box 34 appears when demounting the seat 26. In this state, an article/item can be put into the storage box 34 from above.

Figure 3:
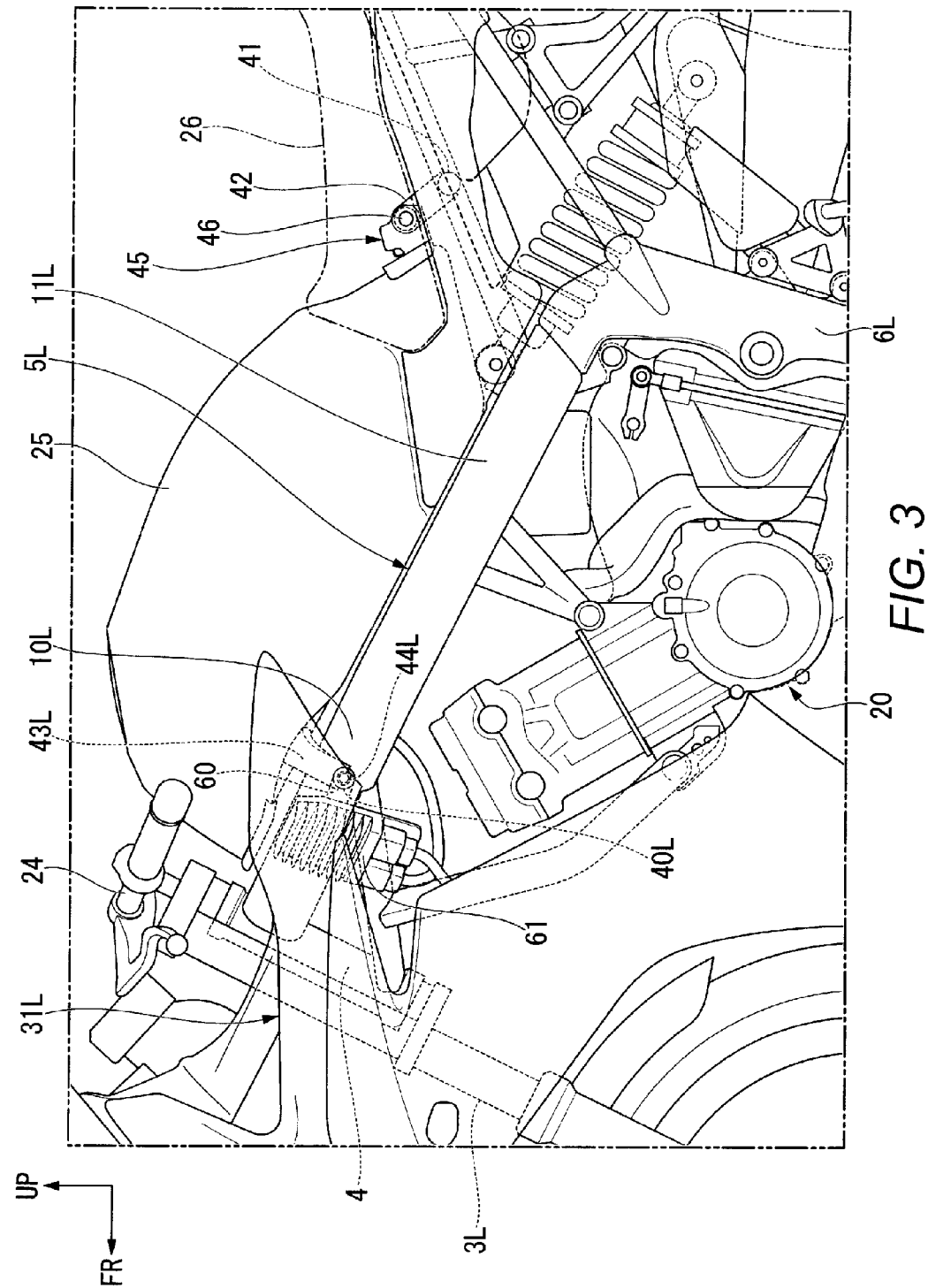
FIG. 3 is a left side view of a vehicle front section of the motorcycle.
Figure 4:
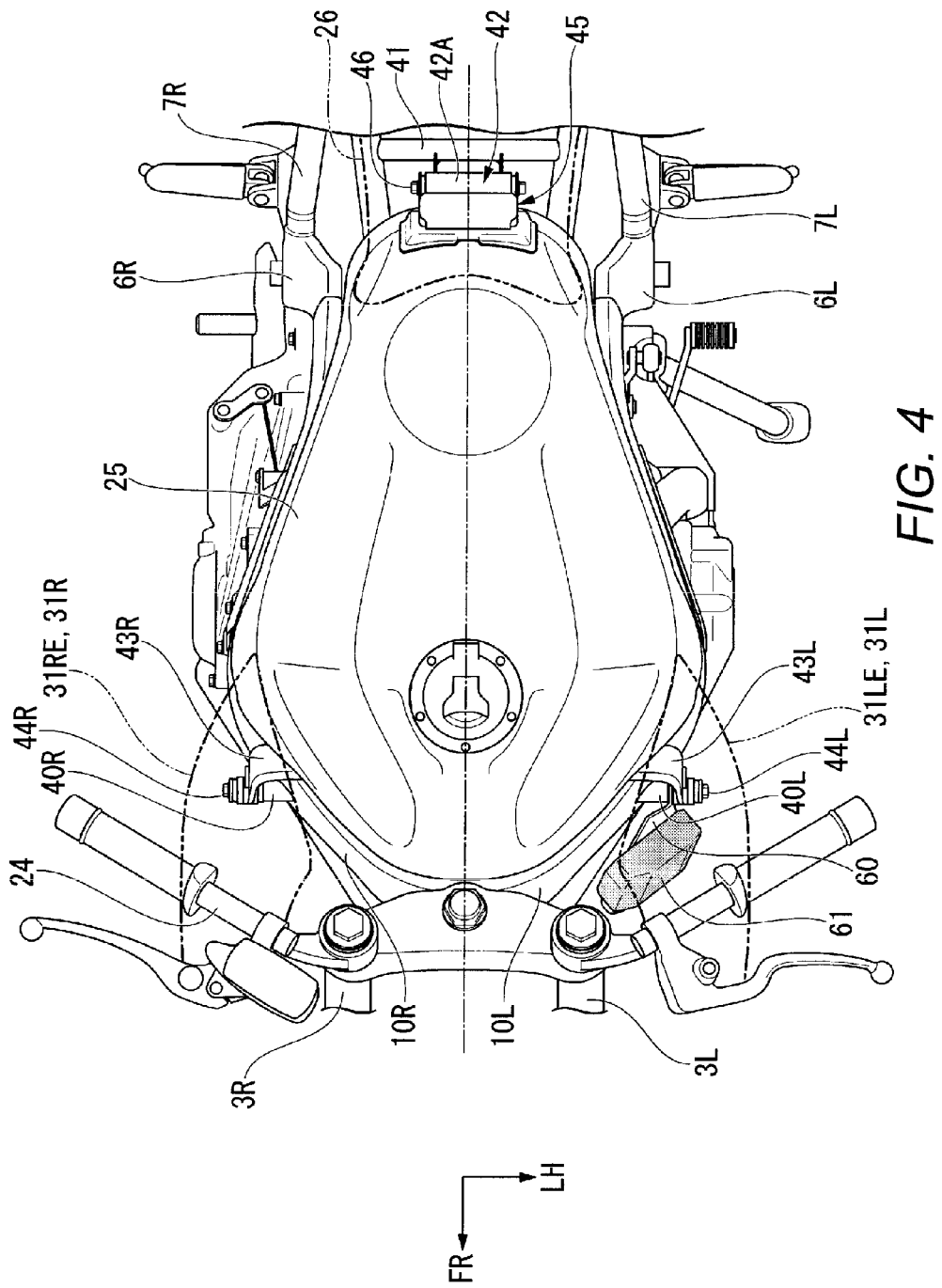
FIG. 4 is a top view of the vehicle front section of the motorcycle.

A support structure for the fuel tank 25 will be described below. Referring to FIG. 2 to FIG. 4, in the embodiment, the front cross frame 12 laying between the front extending portions 10L, 10R of the main frames 5L, 5R extends through both front extending portions 10L, 10R so as to project outward from them in the vehicle width direction. A pair of left and right outer extending portions 40L, 40R, which support a front portion of the fuel tank 25, are provided at the left and right ends of the front cross frame 12 projecting outward from the main frames 5L, 5R in the vehicle width direction. On the other hand, a seat cross frame 41 extends between front portions of the left and right seat frames 7L, 7R. A rear supporter 42 is provided on the seat cross frame 41 to support a rear portion of the fuel tank 25.

In the embodiment, the fuel tank 25 is provided with a pair of left and right tank support stays 43L, 43R extending outward from left and right edges of the underside of the front portion of the fuel tank 25 in the vehicle width direction so as to straddle the main frames 5L, 5R, and then extending downward. Then, the fuel tank 25 is supported by the outer extending portions 40L, 40R in such a manner that bolts 44L, 44R are passed through lower portions of the tank support stays 43L, 43R from the outside in the vehicle width direction and then fastened to the outer extending portions 40L, 40R.

The rear supporter 42 is welded to the seat cross frame 41 to extend upward, and has a tubular portion 42A provided at the leading end of the rear supporter 42 with the axis extending along the vehicle width direction as shown in FIG. 4. On the other hand, the fuel tank 25 has a stay 45 provided on a rear portion of the fuel tank 25 and having a pair of plate elements that extend rearward to be placed on the lateral sides of the left and right ends of the tubular portion 42A. Then, the rear supporter 42 supports the rear portion of the fuel tank 25 in such a manner that a bolt 46 is passed through the plate elements of the stay 45 and the tubular portion 41A and the stay 45 is fastened. In this regard, an elastic member is preferably interposed between the rear supporter 42 and the stay 45.

In this connection, FIG. 3 and FIG. 4 show the seat 26 in a phantom line for the sake of convenience in description. The rear supporter 42 and the stay 45 are placed below the seat 26 so as to be covered with the seat 26 from above.

A support structure for a front portion of the fuel tank 25 is described in detail with reference to FIG. 5 to FIG. 8. The following will describe a support structure of the left tank support stay 43L in the left outer extending portion 40L. A support structure of the right outer extending portion 40R and the right tank support stay 43R is basically similar to that of the left tank support stay and therefore the description is omitted. Incidentally, a tank shroud 31L is omitted in FIG. 5 to FIG. 7.

Figure 5:
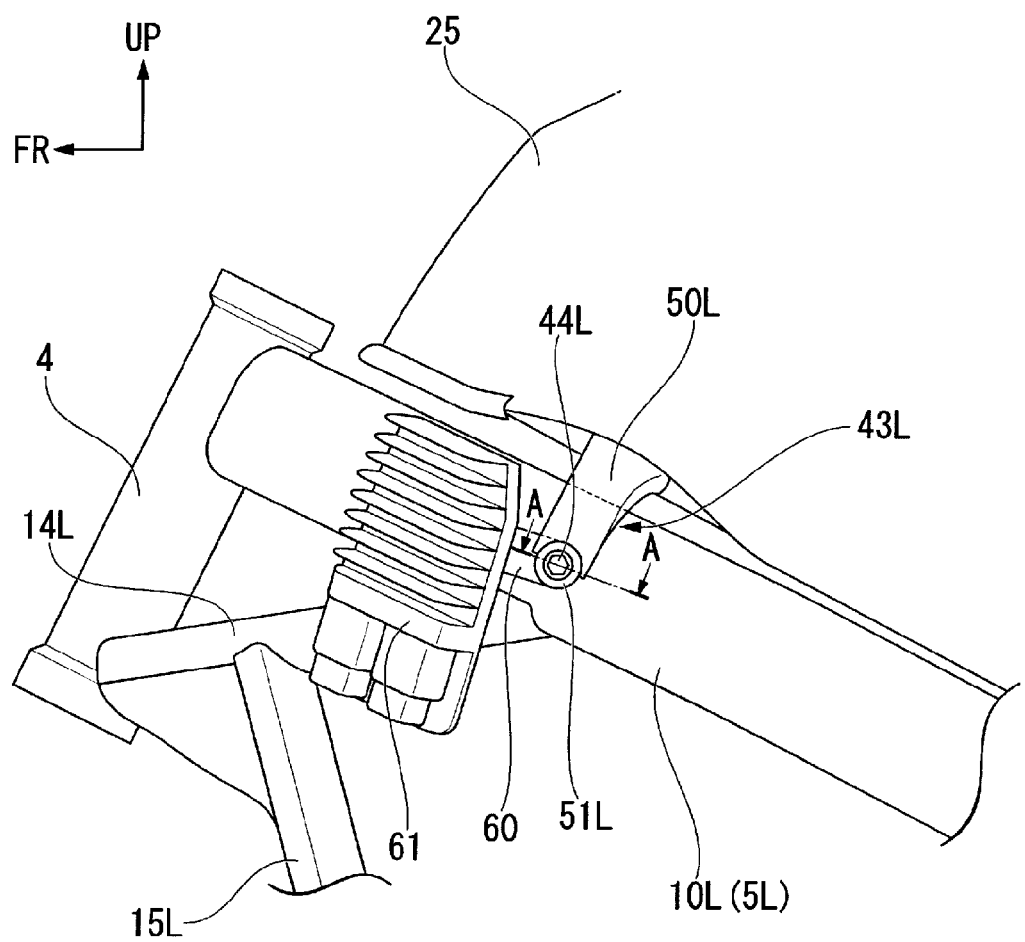
FIG. 5 is a left side view of a front portion of the body frame of the motorcycle.
Figure 6:
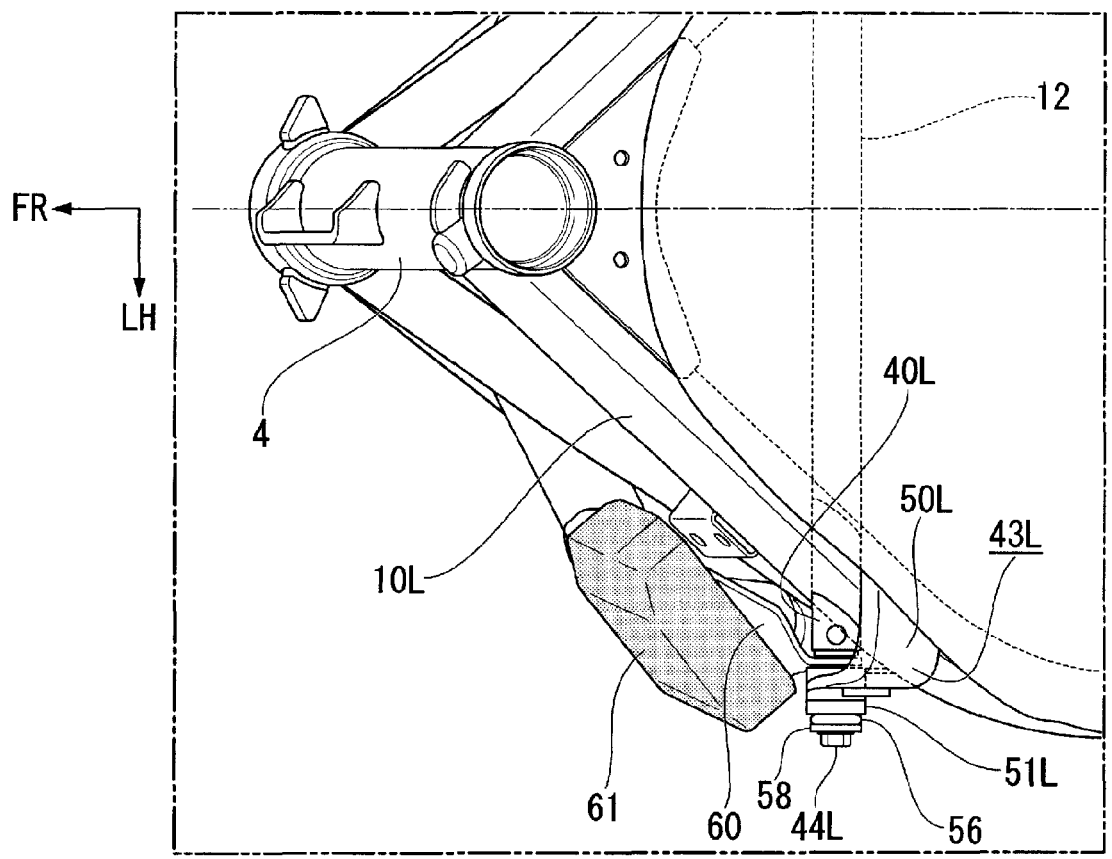
FIG. 6 is a top view of the front portion of the body frame of the motorcycle.
Figure 7:
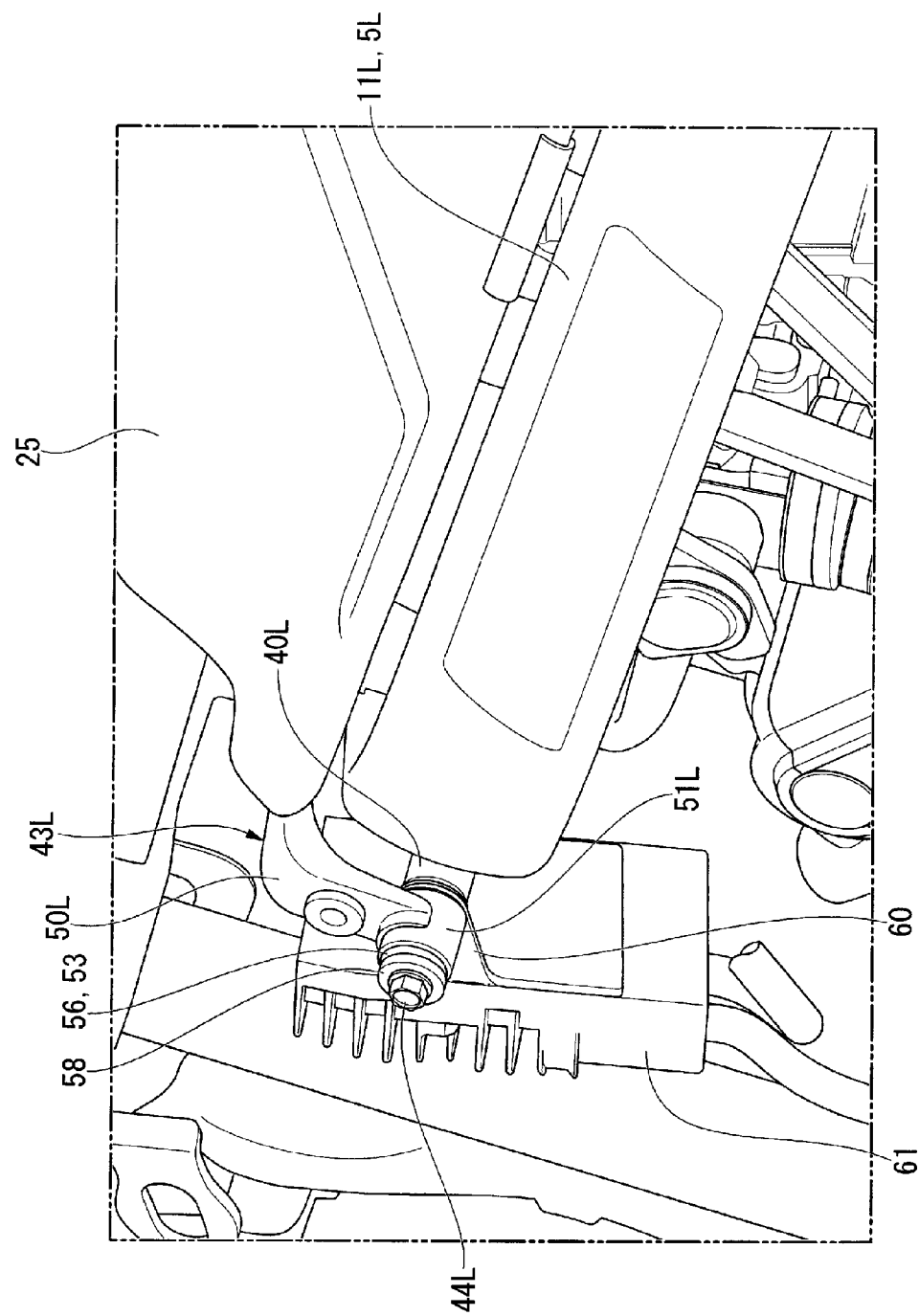
FIG. 7 is a perspective view of the vehicle front section of the motorcycle.

As shown in FIG. 5 to FIG. 7, the tank support stay 43L has an arm 50L which extends outward in the vehicle width direction beyond the main frame 5L and then extends downward to reach the outer extending portion 40L, and a tubular portion 51L which is welded to a lower end of the arm 50L. The bolt 44L is inserted in the axis direction of the outer extending portion 40L from the outside in the vehicle width direction into the tubular portion 51L placed along the axis direction of the outer extending portion 40L. The tank support stay 43L is supported by fastening the inserted bolt 44L to the outer extending portion 40L. A fastening hole 52L into which the bolt 44L is screwed is drilled in the outer extending portion 40L to extend inward in the vehicle width direction (see FIG. 8).

Figure 8:
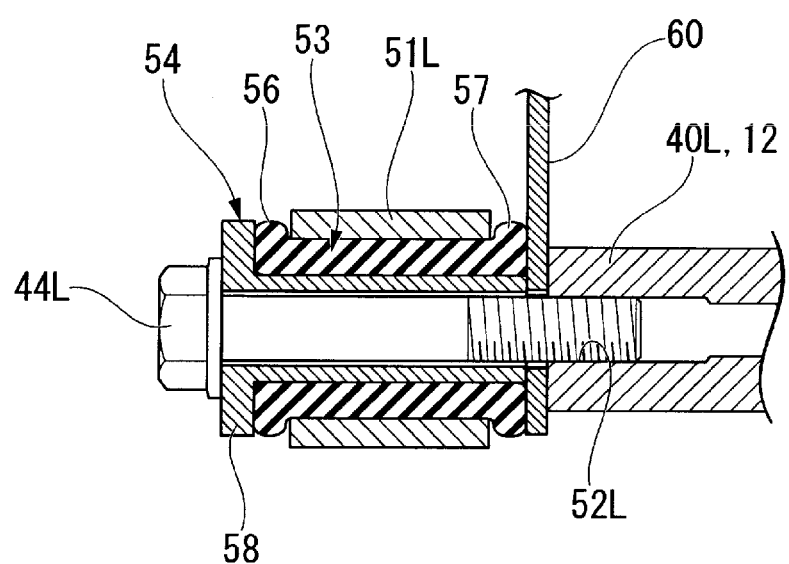
FIG. 8 is a sectional view taken along A-A line in FIG. 5.

As shown in FIG. 8, a cylinder-shaped grommet 53 which is an elastic member is fitted into the tubular portion 51L. A cylinder-shaped collar 54 made of metallic materials or the like is placed inside the grommet 53. Then, the bolt 44L is inserted into the collar 54. Specifically, in the embodiment, the outer extending portion 40L bears the load of the fuel tank 25 through the bolt 44L, and the grommet 53 is interposed between the bolt 44L and the tubular portion 51L in order to elastically support the fuel tank 25.

At both ends in the axial direction of the grommet 53, a flange 56 situated outward in the vehicle width direction and a flange 57 situated inward in the vehicle width direction are formed to extend outward in the radial direction of the grommet 53. The flanges 56, 57 limit the movement of the tubular portion 51L such that the tubular portion 51L fitted over the outer peripheral surface of the grommet 53 is trapped between the flanges 56, 57. A brim 58 extending outward in the radial direction of the collar 54 is formed at the outer end of the collar 54 in the vehicle width direction. The head of the bolt 44L abuts on the brim 58 from the outside in the vehicle width direction.

The outer diameter of the brim 58 is set to be approximately equal to the outer diameter of the flanges 56, 57 of the grommet 53. Because of this, the grommet 53 is limited in movement in the vehicle width direction by the brim 58 of the collar 54, so that the tubular portion 51L is also limited in movement in the vehicle width direction. The collar 54 is formed such that, when the brim 58 is in contact with the flange 56 of the grommet 53 in the axial direction, the inner end of the collar 54 in the vehicle width direction is approximately flush with the end of the flange 57 of the grommet 53.

In the embodiment, an electric component stay 60 is placed directly between the inner ends of the flange 57 and the collar 54 in the vehicle width direction and the outer extending portion 40L. The electric component stay 60 is fastened to the outer extending portion 40L together with the tank support stay 43L by the bolt 44L. Referring to FIG. 5 to FIG. 7, the electric component stay 60 is formed to extend forward from the outer extending portion 40L, and a regulator 61 for voltage control is supported at a front portion of the electric component stay 60. The regulator 61 is supported by the electric component stay 60 such that the longitudinal direction of the regulator 61 extends along the front extending portion 10L.

Referring to FIG. 3 and FIG. 4, in the embodiment, after the fuel tank 25 is mounted on the main frames 5L, 5R, a rear portion of the rear extending portion 31LE of the tank shroud 31L covers the outer extending portion 40L and the tank support stay 43L from above and from the outside in the vehicle width direction. The rear portion of the rear extending portion 31LE also covers an upper portion of the regulator 61.

Here, an example of the operation of fastening the tank support stay 43L to the outer extending portion 40L is described. In the embodiment, initially, the grommet 53 is fitted into the tubular portion 51L of the tank support stay 43L. Then, the tank support stay 43L is placed from above along the outer extending portion 40L. At this time, the electric component stay 60 is placed between the tubular portion 51L and the outer extending portion 40L. Then, the collar 54 is inserted into the grommet 53. Then, the bolt 44L is inserted into the collar 54 and the electric component stay 60 to be fastened to the fastening hole 52L of the outer extending portion 40L. This procedure is also performed on the right side. As a result, the front portion of the fuel tank 25 is fastened and supported by the main frames 5L, 5R.

Note that the right outer extending portion 40R supports the right tank support stay 43R in like manner with the above description, but in the embodiment, a member such as the electric component stay 60 is not fastened jointly between the right outer extending portion 40R and the right tank support stay 43R. However, a member such as the electric component stay 60 may be mounted between the right outer extending portion 40R and the right tank support stay 43R.

The motorcycle 1 according to the embodiment as described above has a structure in which a pair of the right and left outer extending portions 40L, 40R extending outward in the vehicle width direction are provided respectively to the left and right main frames 5L, 5R, and a pair of left and right tank support stays 43L, 43R protruding from the fuel tank 25 are supported by the left and right outer extending portions 40L, 40R. In such a structure, without forming a complicated part such as a recess and the like, the fuel tank 25 can be increased in size in the vehicle width direction as much as possible and the fuel tank 25 can be supported. This makes it easy to ensure the capacity of the fuel tank 25.

In the embodiment, the tank support stays 43L, 43R extend outward in the vehicle width direction from the left and right edges of the fuel tank 25 in such a manner as to be astride the main frames 5L, 5R, to reach the outer extending portions 40L, 40R, respectively. With this structure, in the process of mounting the fuel tank 25, the positions of the outer extending portions 40L, 40R and the tank support stays 43L, 43R are visually recognized readily. Also, since the tank support stays 43L, 43R are attached from above the left and right main frames 5L, 5R to reach the outer extending portions 40L, 40R, the ease of attachment makes the enhancement of productivity possible.

In the embodiment, the front portions of the main frames 5L, 5R are formed to diverge from the head pipe 4 to the right and left so as to extend rearward while extending outward in the vehicle width direction. The outer extending portions 40L, 40R are provided in the front portions of the main frames 5L, 5R. With this structure, the placement of the outer extending portions 40L, 40R in an area where the distance between the front portions (front extending portions 10L, 10R) of the main frames 5L, 5R is reduced in the vehicle width direction makes it possible to minimize the increase in distance between the outer extending portions 40L, 40R toward the outside in the vehicle width direction.

In the embodiment, the outer extending portions 40L, 40R are assigned to both left and right ends of the front cross frame 12 which connects between the front portions of the left and right main frames 5L, 5R and passes through the front portions of the respective main frames 5L, 5R. Further, the outer extending portions 40L, 40R support the tank support stays 43L, 43R via the grommets 53 which are the elastic members. With this structure, the fuel tank 25 is supported by the front cross frame 12 providing relatively high stiffness while ensuring stiffness of the main frames 5L, 5R, thus ensuring the support stiffness for the fuel tank 25. Supporting the tank support stays 43L, 43R through the grommets 53 which are the elastic members minimizes the transfer of vibrations from the main frames 5L, 5R to the fuel tank 25 while the vehicle is moving or the like.

In the embodiment, the tank support stays 43L, 43R are supported by being fastened to the outer extending portions 40L, 40R by a bolt which is a fastening member, and the electric component stay 60 supporting an electric component, which is placed between the left tank support stay 43L and the left outer extending portion 40L, is fastened together with the tank support stay 43L to the outer extending portion 40L by the fastening member. The electric component stay 60 is designed to be fastened to the outer extending portion 40L in such a manner as to be sandwiched directly between the grommet 53 and the outer extending portion 40L.

With this structure, a reduction in the number of components used for fastening is made possible. In addition, because the electric component stay 60 is sandwiched directly between the grommet 53 and the front cross frame 12, the heat of the electric component stay 60 is effectively transferred to the front cross frame 12, resulting in an improvement in thermal dissipation.

In the embodiment, the seat 26 is placed rearward of the fuel tank 25, and the rear supporter 42 supporting a rear portion of the fuel tank 25 is placed below the seat 26. With this structure, the placement of the rear supporter 42 below the seat 26 makes it impossible for the rear supporter 42 to be visually recognized from the outside to achieve an improvement in external appearance. Further, the front portion of the fuel tank 25 is covered from the outside in the vehicle width direction with the tank shrouds 31L, 31R, so that the outer extending portions 40L, 40R and the tank support stays 43L, 43R are covered with the tank shrouds 31L, 31R. With this structure, the outer extending portions 40L, 40R and the tank support stays 43L, 43R are hidden, yielding an improvement in external appearance.

Up to this point the embodiment according to the present invention has been described, but the present invention is not limited to the aforementioned embodiment and various changes can be made without departing from the scope of the invention as set forth in the claims.

For example, the above-mentioned embodiment has described the structure in which the outer extending portions 40L, 40R are provided in the front portions of the main frames 5L, 5R, but the outer extending portions may be provided in a rear portion.

The above-mentioned embodiment has described the outer extending portions 40L, 40R integrated with the front cross frame 12, but the outer extending portions may be separately provided in the main frames 5L, 5R.

The above-mentioned embodiment has described the structure in which the tank support stays 43L, 43R are fastened to the outer extending portions 40L, 40R from the outside in the vehicle width direction by fastening members such as bolts or the like. However, the structure in which the tank support stays 43L, 43R and the outer extending portions 40L, 40R may overlap one another in the up-and-down direction and may be fastened.

The above-mentioned embodiment has described the example of the electric component stay 60 fastened together with the tank support stay 43L to the outer extending portion 40L. However, the electric component stay 60 may not be fastened together with the tank support stay 43L. In this case, an increase of flexibility in placement of the electric component stay 60 is made possible.

A fuel-tank support structure for a motorcycle according to a first aspect of the embodiment is for supporting a fuel tank (25) on a pair of left and right main frames (5L, 5R) extending rearward after diverging from a head pipe (4) to right and left. The structure includes a pair of left and right outer extending portions (40L, 40R) provided respectively in the left and right main frames (5L, 5R) to extend outward in a vehicle width direction, and a pair of left and right tank support stays (43L, 43R) protruding from the fuel tank (25) and supported by the left and right outer extending portions (40L, 40R).

A fuel-tank support structure according to a second aspect of the embodiment is the fuel-tank support structure for a motorcycle according to the first aspect, the tank support stays (43L, 43R) are formed to extend outward in the vehicle width direction from left and right edges of the fuel tank (25) in such a manner as to straddle the main frames (5L, 5R), to reach the outer extending portions (40L, 40R), respectively.

A fuel-tank support structure according to a third aspect of the embodiment is the fuel-tank support structure for a motorcycle according to the first or second aspect, front portions of the main frames (5L, 5R) are formed to extend rearward while extending outward in the vehicle width direction after diverging from the head pipe (4) to the right and left, and the outer extending portions (40L, 40R) are provided in the front portions of the main frames (5L, 5R).

A fuel-tank support structure according to a fourth aspect of the embodiment is the fuel-tank support structure for a motorcycle according to the third aspect, the outer extending portions (40L, 40R) are assigned to both left and right ends of a front cross frame (12) connecting between the front portions of the left and right main frames (5L, 5R) and extending through the front portions of the respective main frames (5L, 5R), and the outer extending portions (40L, 40R) support the tank support stays (43L, 43R) via elastic members (53).

A fuel-tank support structure according to a fifth aspect of the embodiment is the fuel-tank support structure for a motorcycle according to the fourth aspect, the tank support stays (43L, 43R) are supported by being fastened to the outer extending portions (40L, 40R) by a fastening member. Then, an electric component stay (60) supporting an electric component is placed at least either between the left tank support stay (43L) and the left outer extending portion (40L) or between the right tank support stay (43R) and the right outer extending portion (40R), and is fastened together with the tank support stays (43L, 43R) to the outer extending portions (40L, 40R) by the fastening member. Then, the electric component stays (60) is fastened to the outer extending portions (40L, 40R) in such a manner as to be sandwiched directly between the elastic member (53) and the outer extending portions (40L, 40R).

A fuel-tank support structure according to a sixth aspect of the embodiment is the fuel-tank support structure for a motorcycle according to any one of the third to fifth aspects, the seat (26) is placed rearward of the fuel tank (25), and the rear supporter (42) supporting a rear portion of the fuel tank (25) is placed below the seat (26).

A fuel-tank support structure according to a seventh aspect of the embodiment is the fuel-tank support structure for a motorcycle according to any one of the third to sixth aspects, a front portion of the fuel tank (25) is covered from the outside in the vehicle width direction with body covers (31L, 31R), so that the outer extending portions (40L, 40R) and the tank support stays (43L, 43R) are covered with the body covers (31L, 31R).

According to the first aspect, since the tank support stays protruding from the fuel tank are supported by the outer extending portions provided on the main frames to extend outward in the vehicle width direction, without forming a complicated part such as a recess and the like, the fuel tank can be increased in size in the vehicle width direction as much as possible so that the fuel tank can be supported. This makes it easy to ensure the capacity of the fuel tank.

According to the second aspect, in the process of mounting the fuel tank, the positions of the outer extending portions and the tank support stays are visually recognized readily. Also, since the tank support stays are attached from above the left and right main frames to reach the outer extending portions, the ease of attachment makes the enhancement of productivity possible.

According to the third aspect, the placement of the outer extending portions in an area where the distance between the front portions of the main frames is reduced in the vehicle width direction makes it possible to minimize the increase in distance between the outer extending portions toward the outside in the vehicle width direction.

According to the fourth aspect, the fuel tank is supported by the cross frame providing relatively high stiffness while ensuring stiffness of the main frames, thus ensuring the support stiffness for the fuel tank. Supporting the tank support stays through the elastic members minimizes the transfer of vibrations from the main frames to the fuel tank while the vehicle is moving or the like.

According to the fifth aspect, since the electric component stay, together with the tank support stay, is fastened to the outer extending portion by the fastening member such as, for example, a bolt, a reduction in the number of components used for fastening is made possible. In addition, because the electric component stay is sandwiched directly between the elastic member and the front cross frame, the heat of the electric component stay is effectively transferred to the front cross frame, resulting in an improvement in thermal dissipation.

According to the sixth aspect, the placement of the rear supporter below the seat makes it impossible for the rear supporter to be visually recognized from the outside, achieving an improvement in external appearance.

According to the seventh aspect, an improvement in external appearance is made possible.

Obviously, numerous modifications and variations of the present invention are possible in light of the above teachings. It is therefore to be understood that within the scope of the appended claims, the invention may be practiced otherwise than as specifically described herein.

What is claimed is:

1. A fuel-tank support structure for a motorcycle, comprising:
   a head pipe;
   a left main frame extending rearward to diverge from the head pipe to left;
   a right main frame extending rearward to diverge from the head pipe to right;
   a left outer extending portion provided in the left main frame to extend outward in a vehicle width direction of the motorcycle;
   a right outer extending portion provided in the right main frame to extend outward in the vehicle width direction;
   a left tank support stay configured to protrude from a fuel tank and supported by the left outer extending portion; and
   a right tank support stay configured to protrude from the fuel tank and supported by the right outer extending portion,
   wherein the left tank support stay is configured to extend outward in the vehicle width direction from a left edge of the fuel tank to straddle the left main frame and reaches the left outer extending portion, and
   wherein the right tank support stay is configured to extend outward in the vehicle width direction from a right edge of the fuel tank to straddle the right main frame and reaches the right outer extending portion.

2. The fuel-tank support structure for a motorcycle according to claim 1,
   wherein front portions of the left and right main frames extend rearward while extending outward in the vehicle width direction to diverge from the head pipe to left and right, respectively, and
   wherein the left and right outer extending portions are provided in the front portions of the left and right main frames, respectively.

3. The fuel-tank support structure for a motorcycle according to claim 2,
   wherein the left and right outer extending portions are respectively left and right ends of a front cross frame connecting between the front portions of the left and right main frames and extending through the front portions of the left and right main frames, and
   the left and right outer extending portions support the left and right tank support stays via a left elastic member and a right elastic member, respectively.

4. The fuel-tank support structure for a motorcycle according to claim 3,
   wherein the left tank support stay is supported by being fastened to the left outer extending portion by a left fastening member,
   wherein a left electric component stay supporting an electric component is placed between the left tank support stay and the left outer extending portion, and is fastened together with the left tank support stay to the left outer extending portion by the left fastening member, and
   wherein the left electric component stay is fastened to the left outer extending portion to be sandwiched directly between the left elastic member and the left outer extending portion.

5. The fuel-tank support structure for a motorcycle according to claim 4,
   wherein the right tank support stay is supported by being fastened to the right outer extending portion by a right fastening member,
   wherein a right electric component stay supporting an electric component is placed between the right tank support stay and the right outer extending portion, and is fastened together with the right tank support stay to the right outer extending portion by the right fastening member, and
   wherein the right electric component stay is fastened to the right outer extending portion to be sandwiched directly between the right elastic member and the right outer extending portion.

6. The fuel-tank support structure for a motorcycle according to claim 5,
   wherein the right tank support stay is supported by being fastened to the right outer extending portion by a right fastening member, wherein a right electric component stay supporting an electric component is placed between the right tank support stay and the right outer extending portion, and is fastened together with the right tank support stay to the right outer extending portion by the right fastening member, and wherein the right electric component stay is fastened to the right outer extending portion to be sandwiched directly between the right elastic member and the right outer extending portion.

7. The fuel-tank support structure for a motorcycle according to claim 2, wherein a seat is configured to be placed rearward of the fuel tank, and wherein a rear supporter configured to support a rear portion of the fuel tank is placed below the seat.

8. The fuel-tank support structure for a motorcycle according to claim 2, wherein the left outer extending portion and the left tank support stay are configured to be covered with a left body cover that is configured to cover a front portion of the fuel tank from an outside of the fuel tank in the vehicle width direction, and wherein the right outer extending portion and the right tank support stay are configured to be covered with a right body cover that is configured to cover the front portion of the fuel tank from the outside of the fuel tank in the vehicle width direction.

9. A fuel-tank and support structure for a motorcycle, comprising:

a fuel tank;

a left outer extending portion provided in a left main frame to extend outward in a vehicle width direction of the motorcycle, the left main frame extending rearward to diverge from a head pipe to left;

a right outer extending portion provided in a right main frame to extend outward in the vehicle width direction, the right main frame extending rearward to diverge from the head pipe to right;

a left tank support stay protruding from the fuel tank and supported by the left outer extending portion; and a right tank support stay protruding from the fuel tank and supported by the right outer extending portion, wherein the left tank support stay extends outward in the vehicle width direction from a left edge of the fuel tank to straddle the left main frame and reaches the left outer extending portion, and wherein the right tank support stay extends outward in the vehicle width direction from a right edge of the fuel tank to straddle the right main frame and reaches the right outer extending portion.

10. The fuel-tank and support structure for a motorcycle according to claim 9, wherein front portions of the left and right main frames extend rearward while extending outward in the vehicle width direction to diverge from the head pipe to left and right, respectively, and wherein the left and right outer extending portions are provided in the front portions of the left and right main frames, respectively.

11. The fuel-tank and support structure for a motorcycle according to claim 10, wherein the left and right outer extending portions are respectively left and right ends of a front cross frame connecting between the front portions of the left and right main frames and extending through the front portions of the left and right main frames, and the left and right outer extending portions support the left and right tank support stays via a left elastic member and a right elastic member, respectively.

12. The fuel-tank and support structure for a motorcycle according to claim 11, wherein the left tank support stay is supported by being fastened to the left outer extending portion by a left fastening member, wherein a left electric component stay supporting an electric component is placed between the left tank support stay and the left outer extending portion, and is fastened together with the left tank support stay to the left outer extending portion by the left fastening member, and wherein the left electric component stay is fastened to the left outer extending portion to be sandwiched directly between the left elastic member and the left outer extending portion.

13. The fuel-tank and support structure for a motorcycle according to claim 12, wherein the right tank support stay is supported by being fastened to the right outer extending portion by a right fastening member, wherein a right electric component stay supporting an electric component is placed between the right tank support stay and the right outer extending portion, and is fastened together with the right tank support stay to the right outer extending portion by the right fastening member, and wherein the right electric component stay is fastened to the right outer extending portion to be sandwiched directly between the right elastic member and the right outer extending portion.

14. The fuel-tank and support structure for a motorcycle according to claim 11, wherein the right tank support stay is supported by being fastened to the right outer extending portion by a right fastening member, wherein a right electric component stay supporting an electric component is placed between the right tank support stay and the right outer extending portion, and is fastened together with the right tank support stay to the right outer extending portion by the right fastening member, and wherein the right electric component stay is fastened to the right outer extending portion to be sandwiched directly between the right elastic member and the right outer extending portion.

15. The fuel-tank and support structure for a motorcycle according to claim 10, wherein a seat is placed rearward of the fuel tank, and wherein a rear supporter supporting a rear portion of the fuel tank is placed below the seat.

16. The fuel-tank and support structure for a motorcycle according to claim 10, wherein a front portion of the fuel tank is covered from an outside of the fuel tank in the vehicle width direction with a left body cover so that the left outer extending portion and the left tank support stay are covered with the left body cover, and wherein the front portion of the fuel tank is covered from the outside of the fuel tank in the vehicle width direction with a right body cover so that the right outer extending portion and the right tank support stay are covered with the right body cover.

* * * * *